US008196532B2

(12) United States Patent
Andrus, Jr. et al.

(10) Patent No.: US 8,196,532 B2
(45) Date of Patent: Jun. 12, 2012

(54) AIR-FIRED $CO_2$ CAPTURE READY CIRCULATING FLUIDIZED BED HEAT GENERATION WITH A REACTOR SUBSYSTEM

(76) Inventors: Herbert E. Andrus, Jr., Granby, CT (US); Gregory N. Liljedahl, Tariffville, CT (US); John L Marion, West Simsbury, CT (US); Nsakala Ya Nsakala, South Windsor, CT (US)

( * ) Notice: Subject to any disclaimer, the term of this patent is extended or adjusted under 35 U.S.C. 154(b) by 729 days.

(21) Appl. No.: 12/392,436

(22) Filed: Feb. 25, 2009

(65) Prior Publication Data

US 2009/0211500 A1    Aug. 27, 2009

Related U.S. Application Data

(60) Provisional application No. 61/031,761, filed on Feb. 27, 2008, provisional application No. 61/031,764, filed on Feb. 27, 2008.

(51) Int. Cl.
*F23G 5/30* (2006.01)
*F23L 15/00* (2006.01)

(52) U.S. Cl. .................. 110/245; 110/302; 110/347

(58) Field of Classification Search .......... 110/243, 110/244, 245, 302, 303; 122/4 D, 18.2; 165/901
See application file for complete search history.

(56) References Cited

U.S. PATENT DOCUMENTS 5,878,677 A * 3/1999 Muller et al. ............. 110/345
6,505,567 B1 * 1/2003 Liljedahl et al. ............. 110/344
6,737,031 B2   5/2004 Beal et al.

FOREIGN PATENT DOCUMENTS

| DE | 976167 | 4/1963 |
|----|--------|--------|
| DE | 976379 | 7/1963 |
| DE | 3013390 A1 | 10/1981 |
| EP | 0081114 A2 | 6/1983 |
| WO | WO 01/73343 A1 | 10/2001 |

OTHER PUBLICATIONS

PCT International Search Report and the Written Opinion of the International Searching Authority dated Nov. 3, 2010—(PCT/US2009/035212).

* cited by examiner

*Primary Examiner* — Kenneth Rinehart
*Assistant Examiner* — David J Laux
(74) *Attorney, Agent, or Firm* — Lawrence P. Zale (57) ABSTRACT

A combustor 110 combust a fluidized bed of fossil fuel 114, 114' to heat a working fluid 102 and generate flue gas 104. An air preheater 144 has first and second gas passageways 144a, 144b for respectively directing the generated flue gas 150 and another gas 250 with captured $CO_2$ generated by combustion outside of the combustor 110. When operated in a non-$CO_2$ capture, the air preheater 144 receives the flue gas 150, but not the other gas 250, and the first gas passageway 144a directs the flue gas 150 so as to preheat the air 188. However, when operated in the $CO_2$ capture mode, the air preheater 144 receives the flue gas 150 and the other gas 250, and the second gas passageway 144b also directs the other gas 250 so as to preheat the air 188'. In either mode, the preheated air 188, 188' is applied by the combustor 110 to fluidize a bed of fossil fuel 114, 114'.

20 Claims, 1 Drawing Sheet

US 8,196,532 B2

AIR-FIRED CO₂ CAPTURE READY CIRCULATING FLUIDIZED BED HEAT GENERATION WITH A REACTOR SUBSYSTEM

RELATED APPLICATIONS

The present invention claims benefit of U.S. Provisional Patent Application Ser. No. 61/031,764, entitled "AIR-FIRED $CO_2$ CAPTURE READY CIRCULATING FLUIDIZED BED HEAT GENERATION", and U.S. Provisional Patent Application Ser. No. 61/031,761, entitled "AIR-FIRED $CO_2$ CAPTURE READY CIRCULATING FLUIDIZED BED HEAT GENERATION WITH A REACTOR SUBSYSTEM", which are incorporated herein by reference in their entirety.

FIELD OF THE INVENTION

The present invention relates generally to heat generation. More particularly, the present invention relates to air-fired $CO_2$ capture ready fluidized bed heat generation. The invention is particularly suitable for designing air fired circulating fluidized bed heat generating systems for subsequent $CO_2$ capture.

BACKGROUND OF THE INVENTION

Heat generating systems with furnaces for combusting fossil fuels have long been employed to generate controlled heat, with the objective of doing useful work. The work might be in the form of direct work, as with kilns, or might be in the form of indirect work, as with steam generators for industrial or marine applications or for driving turbines that produce electric power. Modern water-tube furnaces for steam generation can be of various types including fluidized-bed boilers. While there are various types of fluidized-bed boilers, all operate on the principle that a gas is injected to fluidize solids prior to combustion in the reaction chamber.

In circulating fluidized-bed (CFB) type boilers a gas, e.g. air, is passed through a bed of solid particles to produce forces that tend to separate the particles from one another. As the gas flow is increased, a point is reached at which the forces on the particles are just sufficient to cause separation. The bed then becomes fluidized, with the gas cushion between the solids allowing the particles to move freely and giving the bed a liquid-like characteristic. The bulk density of the bed is relatively high at the time of fluidization, but will decrease as it flows upward through the reaction chamber where it is combusted to generate heat.

The solid particles forming the CFB typically include fuel particles, such as crushed or pulverized coal or other solid fuel, and sorbent particles, such as crushed or pulverized limestone, dolomite or other alkaline earth material. Combustion of the CFB in the reaction chamber of the boiler produces flue gas and ash. During the combustion process, carbon in the fuel is oxidized resulting in the generation of carbon dioxide ($CO_2$). Nitrogen is also oxidized resulting in the generation of nitrogen oxide ($NO_x$). Additionally, sulfur is oxidized to form sodium dioxide ($SO_2$). The $CO_2$, $NO_x$, $SO_2$ and other gasses generated during combustion form the flue gas. The ash consist primarily of unburned solids including inert material and sorbent particles. The ash, or some portion thereof, is sometimes referred to as particulate matter. The ash is entrained and carried in an upwardly flow by the hot flue gas, and is exhausted from the furnace with the hot flue gas. During this flow, the $SO_2$ in the flue gas will be absorbed by the sorbent.

An air pollution control (APC) subsystem is conventionally used to remove various so called pollutants, including $CO_2$, $NO_x$, $SO_2$ and particulate matter, from the flue gas produced by such heat generating systems. Thus, the flue gas exhausted from the furnace is directed to the various components of an APC subsystem before reaching the stack and being exhausted into the atmosphere. Each of the APC components can be considered a system in its own right. For example, the flue gas may be processed via cyclone separator and/or electrostatic precipitator to remove particulate matter, via a selective catalytic reduction (SCR) system to remove $NO_x$, via a $SO_2$ scrubber system to remove $SO_2$, and via a $CO_2$ scrubber system to remove $CO_2$.

However, there are also other ways to reduce emissions. For example, it is known that $CO_2$ and $NO_x$ emissions can be reduced by using oxygen in the combustion process. More particularly, U.S. Pat. No. 6,505,567, which issued on Jan. 14, 2003, is entitled "Oxygen Fired Circulating Fluidized Bed Steam Generator" and is assigned to the assignee of the present application, describes a CFB steam generating system that uses oxygen, in lieu of air, to fluidize the fuel in the CFB. The described system facilitates the use of $CO_2$ both as a desirable end product and in support to the combustion process. The disclosure of the '567 patent is incorporated in its entirety herein by reference.

According to the described technique, a substantially pure oxygen feed stream is introduced into a CFB steam generator and the fuel is combusted in the presence of the substantially pure oxygen feed stream to produce a flue gas which has $CO_2$ and water vapor as its two largest constituent elements by volume and which is substantially free of $NO_x$. The flue gas is passed through an oxygen feed stream pre-heater, which transfers heat from the flue gas to the oxygen feed stream. Furthermore, the flue gas is separated into an end product portion and a recycling portion. The end product portion of the flue gas is cooled and compressed so as to yield $CO_2$ in a liquid phase and the recycling portion of the flue gas is directed back to the CFB steam generator to contribute to the combustion process therein.

The technique disclosed in the '567 patent offers the flexibility to use the produced $CO_2$ as a desirable end product and in support of the combustion process. The production of liquid $CO_2$ also improves the heat output of the heat generating system. However, while the disclosed technique can be used to significantly reduce $CO_2$ emissions, there remains a reluctance in many quarters to add coal fired heat generating system capacity because of concerns regarding the future governmental regulation $CO_2$ emissions and the costs of meeting these regulations. In this regard, studies have shown that the investment costs to retrofit traditionally designed CFB coal fired steam generating system for $CO_2$ capture can be in the range of $1000 to $1600 per kilowatt (kW). Studies have also shown that the energy penalty for $CO_2$ capture can range from 25% to 40%. Furthermore, particularly in retrofit situations, the system site itself may be insufficient to accommodate an architecture of the type described in the '567 patent.

Thus, while there is a recognized need for more heat generating system capacity to, for example, produce additional electrical power, and it is also recognized that CFB coal fired systems are an efficient means to generate such heat, the ongoing debate over global warming, and the increasing attention being given to $CO_2$ emissions from the burning of fossil fuels such as coal, and most particularly the cost of capturing $CO_2$ in terms of both capital expense and reduced energy production, have undoubtedly delayed some if not many installations, which could increase capacity and thereby increase the availability of power to the nation and the world.

Accordingly, a need exist for a new technique for capturing $CO_2$ generated by CFB fossil fuel fired steam generating systems.

OBJECTS OF THE INVENTION

Accordingly, it is an objective of the present invention to provide a technique for capturing $CO_2$ generated by fossil fuel fired steam or other heat generating system that can be implemented at less expense and/or greater efficiency than known techniques.

Additional objects, advantages, novel features of the present invention will become apparent to those skilled in the art from this disclosure, including the following detailed description, as well as by practice of the invention. While the invention is described below with reference to a preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY OF THE INVENTION

In accordance with the invention, a heat generating system that is operable in either a non-$CO_2$ capture mode or a $CO_2$ capture mode has a preheater for preheating air that includes a first passageway and a second passageway. The system is operated by combusting a fluidized bed of fossil fuel, such as coal or another fossil fuel, to heat a working fluid and generate first gas. The first gas could be formed of a single type of gas or a combination of multiple different types of gasses, but will most often be what is commonly referred to as flue gas. Preferably, the fluidized bed is a circulating fluidized bed (CFB), although this is not mandatory. This working fluid will sometimes be referred to as the first working fluid, and could be water, steam, a mixture of water and steam, or some other type working fluid.

In the non-$CO_2$ capture mode, only the generated first gas is directed via the first passageway to preheat the air, thereby cooling the directed first gas. The cooled first gas is directed along a first path, and a bed of fossil fuel is fluidized with the preheated air.

On the other hand, according to an aspect of the invention, if operated in the $CO_2$ capture mode, residual solids generated by the combusting of the fluidized bed is also combusted to generate second gas with captured $CO_2$. The second gas could also be formed of a single type of gas or a combination of multiple different types of gasses, but will most often be what is commonly referred to as flue gas. In this mode, not only does the generated first gas continue to be directed via the first passageway, but the generated second gas is also directed via the second passageway to preheat the air, thereby also cooling the directed second gas. The cooled second gas is directed to a second path different than the first path and can be processed downstream of the air preheater in any known or other suitable manner to remove $CO_2$ captured in the second gas.

Typically the combusting of the fluidized bed also generates residual solids, which will sometimes be referred to as first solids, that are entrained in the generated first gas. In such a case, the entrained solids are preferably separated from the generated first gas, and the first gas directed via the first passageway is the separated first gas. In the non-$CO_2$ capture mode, heat from these separated solids is transferred to thereby cool the separated solids. These cooled solids are also combusted to heat the working fluid.

In the $CO_2$ capture mode, the separated first solids, rather than being cooled, are preferably combusted to generate the second gas and residual second solids that are entrained in the generated second gas. The entrained second solids are separated from the generated second gas and heat is transferred from at least a portion of the separated second solids to thereby cool the separated second solids. In the $CO_2$ capture mode these cooled second solids are beneficially also combusted to heat the working fluid. In a particularly preferred implementation, a portion of the separated second solids is also combusted to generate second gas with captured $CO_2$.

While not mandatory, advantageously in the $CO_2$ capture mode, heat is transferred from the cooled second gas to a second working fluid, to thereby heat the second working fluid. This second working fluid could also be water, steam, a mixture of water and steam, or some other type working fluid. However, preferably this working fluid will be of the same type as the first working fluid. A turbine can then be driven with the heated first working fluid as well as the heated second working fluid.

In an exemplary system implementation, a heat generating system that is operable in either the non-$CO_2$ capture mode or the $CO_2$ capture mode will include a combustor configured, i.e. sized, shaped and/or incorporating the necessary components, to combust a fluidized bed of fossil fuel to thereby heat a working fluid, and generate flue gas. The combustor is also configured to exhaust the heated working fluid and the generated flue gas. A preheater is included to preheat air, and has a first gas passageway for directing the exhausted flue gas and a second gas passageway configured to direct other gas with captured $CO_2$ generated by combustion outside of the combustor. The combustor is further configured to fluidize a bed of fossil fuel with the preheated air. In the non-$CO_2$ capture mode, the preheater receives the exhausted flue gas, but not the other gas, and the first passageway directs the received flue gas so as to preheat the air, thereby cooling the received flue gas.

On the other hand, in the $CO_2$ capture mode, the air preheater preferably receives both the exhausted flue gas and the other gas, and the first passageway directs the received flue gas and the second passageway directs the received other gas so as to preheat the air, thereby cooling both the flue gas and the other gas. The cooled flue gas is directed from the air preheater to a first path, and the cooled other gas is directed from the air preheater to a second path different than the first path.

As noted above, the combustion of the fluidized bed typically also generates residual solids that are entrained in the exhausted flue gas. If this is the case, the system will preferably also include a separator, which will sometimes be referred to as a first separator, and a heat exchanger. The separator could be a cyclone or other type separator. The separator is configured to separate the entrained solids from the exhausted flue gas, and the flue gas received by the air preheater will be the separated flue gas. The heat exchanger is configured to transfer heat from solids to thereby cool the solids. In the non-$CO_2$ capture mode, the heat exchanger receives the solids separated by the separator and transfers heat from these received solids to thereby cool these solids. If a heat exchanger is provided, the combustor is beneficially further configured to combust the cooled solids.

On the other hand, in the $CO_2$ capture mode the system preferably will also include a reactor and another or second separator. This separator could also be a cyclone or other type separator. In this mode, the reactor is configured to receive the separated solids from the first separator, combust the received solids to thereby generate the other gas with captured $CO_2$ and residual other solids, and exhaust the generated other gas with the other solids entrained therein. The second separator is configured to separate the entrained other solids from the exhausted other gas. The heat exchanger receives at least a portion of these separated other solids. Unlike in the non-$CO_2$ capture mode, in this mode the heat exchanger does not receive separated solids from the first separator. Thus, in the $CO_2$ capture mode, the heat exchanger preferably transfers heat only from the received other solids that have been separated by the second separator, thereby cooling the received other solids. According to yet another preferred but optional aspect of the invention, the reactor can be further configured to also receive and combust a portion of the separated other solids.

Optionally, although beneficially, in the $CO_2$ capture mode the system may include a working fluid heater configured to receive the cooled other gas directed from the air preheater to the second path and a second working fluid. If so, the heater transfers heat from the received other gas to the received second working fluid, to thereby heat the second working fluid. The working fluid heater is also configured to exhaust the heated second working fluid. A turbine can be configured to receive the heated first working fluid exhausted from the combustor as well as the heated second working fluid exhausted from the working fluid heater.

In a preferred embodiment of the invention, in the $CO_2$ capture mode the system additionally includes a $CO_2$ remover configured to receive the cooled other gas directed from the air preheater to the second path and to remove $CO_2$ captured in the received other gas.

In an exemplary system implementation for capturing $CO_2$, the heat generating system may include a combustor, reactor and air preheater. The combustor combusts a fluidized bed of fossil fuel to heat a working fluid and to generate first gas and residual first solids. The reactor combusts the generated first solids to thereby generate second gas and residual second solids. Here again, the air preheater has a first gas passageway for directing the generated first gas and a second gas passageway for directing the generated second gas so as to preheat air and cool the directed first and second gasses. The combustor also applies the preheated air to fluidize a bed of fossil fuel.

As noted above, typically the generated first gas is exhausted from the combustor with the generated first solids entrained therein, and the generated second gas is exhausted from the reactor with the generated residual second solids entrained therein. In such a case, preferably first and second separators are included in the system. The first separator separates the entrained first solids from the exhausted first gas. Thus, the generated first gas directed by first gas passageway will be the separated first gas and the generated first solids combusted by the reactor will be the separated first solids. The second separator separates the entrained second solids from the exhausted second gas. Hence, the generated second gas directed by second gas passageway will be the separated second gas.

Preferably also included is a heat exchanger for transferring heat from at least a portion of the separated second solids to thereby cool these separated hot other solids. If so, the combustor also combusts the cooled second solids. Optionally, the reactor may also combust a portion of the separated second solids.

The air preheater preferably directs the cooled first gas to a first path and the cooled second gas to a different second path. If so, beneficially a working fluid heater receives the cooled second gas directed to the second path and another working fluid, and transfers heat from the received second gas to the received other working fluid to thereby heat the other working fluid. A turbine receives both the heated working fluid from the combustor and the heated working fluid from the heater. Whether or not a working fluid heater is included, a $CO_2$ remover may be included to receive only the cooled second gas directed to the second path and remove $CO_2$ captured in the received second gas.

ENABLING DESCRIPTION OF A PREFERRED EMBODIMENT(S)

Common System Components and Associated Operations

Figure 1:
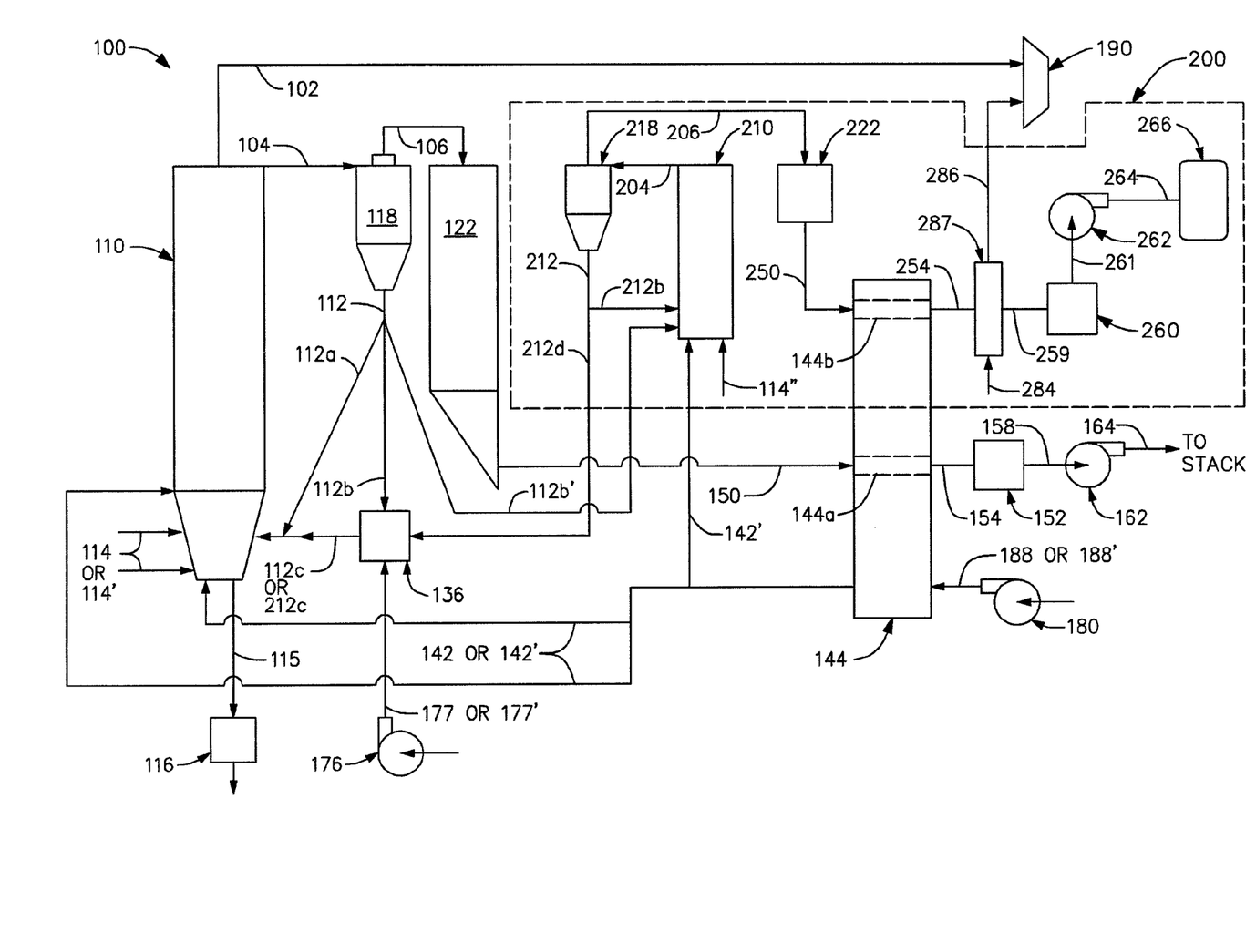
FIG. 1 is a schematic view of an air or heat generating system including a circulating fluidized bed (CFB) steam generator, which is capable of capturing a carbon dioxide ($CO_2$) end product, in accordance with the present invention.

FIG. 1 depicts a schematic view of an exemplary air fired circulating fluidized bed (CFB) heat generating system 100, in accordance with the present invention. The CFB heat generating system 100, uses air to combust the fossil fuel.

In the particular exemplary implementation described below, the fossil fuel is pulverized coal. It should be understood that other types of fossil fuels could be utilized in lieu of pulverized coal, however preferably a fossil fuel with a high carbon content such as pulverized coal or petcoke, or a biomass is used. The working fluid is $H_2O$, which may be in a liquid, gaseous or mixed liquid and gaseous state at different points in the process. However, here again it should be understood that other types of working fluids could be utilized in lieu of $H_2O$. Furthermore, it will be understood that the working fluids which flow within various components could be of the same type or different types.

The CFB heat generating system 100 is capable of operating as a single cycle power generating system, to generate electrical power. However, when fitted for $CO_2$ capture, the CFB heat generating system 100 is capable of operating as a combined cycle power generating system, to both generate electrical power and produce a carbon dioxide ($CO_2$) end product. When fitted for $CO_2$ capture, the CFB heat generating system 100 may also optionally produce a nitrogen (Nx) end product.

The CFB heat generating system 100 is particularly beneficial in minimizing or even eliminating any energy penalty for $CO_2$ capture. Indeed, after being fitted for $O_2$ firing, approximately the same net electrical output can be obtained.

The CFB heat generating system 100 has an air fired CFB heat generator 110, which serves as a fluidization and fuel combustion vessel, and is sometimes referred to as a combustor. The system 100 also includes a number of downstream flue gas treatment components, some of which are commonly considered part of an air pollution control (APC) subsystem.

Overview of Operational Changes Between the Non-$CO_2$ Capture Mode and the $CO_2$ Capture Mode, and Related Component Sizing Functionally, all of the components of the CFB heat generating system 100 that are used in both the non-$CO_2$ capture mode and the $CO_2$ capture mode perform identically in both modes of operation. However, as will be described below, when operating in the $CO_2$ capture mode the capacity of the flows that must be handled by the commonly utilized components in the CFB heat generating system 100 will differ from the flows handled by the corresponding component in the CFB heat generating system 100 operating in the non-$CO_2$ capture mode. That is, attributes, such as volume and/or temperature, of flows will differ. For example, in the Non-$CO_2$ capture mode, the flow of working fluid 102 from the CFB heat generator 110 will have a lower volume than the flow of working fluid flow 102 from the CFB heat generator 110 in the $CO_2$ capture mode. As will be highlighted below, in the case of some of these components, this will require that the component itself be somewhat oversized, i.e. larger than necessary, for operation in the non-$CO_2$ capture mode. However, in the case of other components, only an adjustment in the operational control of the component will be required, and hence the component can be sized for operation in the non-$CO_2$ capture mode.

Accordingly, as will be further described below, in the CFB heat generating system 100 some components are sized above what is necessary in the non-$CO_2$ capture mode of operation. Preferably, these components are upsized to provide approximately ten to fifteen percent (10-15%) more capacity than that required in the non-$CO_2$ capture mode. This extra capacity is utilized only when operating in the $CO_2$ capture mode to reduce or eliminate the penalty conventionally paid for the $CO_2$ capture.

Fluidizing and Combusting Fuel to Heat Working Fluid that Drives a Turbine

The CFB heat generator 110 includes a furnace defined by wall tubes. The fuel is combusted in the furnace and generates heat. More particularly, air 142 is supplied to a lower segment of the furnace of the CFB heat generator 110. There it fluidizes and reacts with the fuel and sorbent mixture 114 being fed into the lower segment of the furnace of the CFB heat generator 110, thus aiding in the combustion of the fuel.

The air 142 is preferably fed of the CFB heat generator 110 both through a floor grate and through inlets at two levels above the floor grate, as shown. Moreover, it is preferred that the mixture of fuel and sorbent 114 be fed to the furnace through air-assisted fuel and sorbent feed nozzles to thereby advantageously minimize wall penetration opening size and fuel chute plugging potential.

The air fired combustion of the fuel in the fuel and sorbent mixture 114 produces hot combustion gases, which are commonly referred to as flue gas, and hot residual solids, which are commonly referred to as ash. Some of the hot solids fall to the bottom of the furnace. Ultimately these hot solids, which are designated as hot solids 115, are drained from the bottom of the furnace of the CFB heat generator 110 to a conventional or other suitable ash cooler 116.

However, much of the produced hot solids are entrained in the hot combustion gases, i.e. in the flue gas. The flue gas, with the hot solids entrained therein, rises within the furnace of the CFB heat generator 110, and is exhausted from the upper segment of the CFB heat generator 110 as flue gas 104.

The furnace is cooled by the transfer of heat from combustion to a working fluid flowing through the furnace wall tubes. As noted above, in this exemplary implementation the working fluid is $H_2O$. As heat is transferred to the working fluid, it rises in an upwardly flow in the wall tubes of the furnace of the CFB heat generator 110. Heated working fluid 102 is ultimately exhausted from an upper segment of the CFB heat generator 110 and directed by piping to a turbine 190, which in this implementation is a steam turbine, included in the CFB heat generating system 100. The heated working fluid drives the turbine 190. The turbine 190 in turn drives a generator (not shown) to thereby generate electricity.

When the CFB heat generating system 100 is operating in the $CO_2$ capture mode, the amount of fossil fuel and sorbent 114' introduced to the CFB heat generator 110 is increased, preferably by approximately ten to fifteen percent (10-15%) above the amount of fossil fuel and sorbent 114 introduced to the CFB heat generator 110 when operating in the non-$CO_2$ capture mode. Accordingly, the components (not shown) for transporting the fossil fuel and sorbent 114 and 114' to the CFB heat generator 110 will also need to have a capacity approximately ten to fifteen percent (10-15%) over that required for transporting the fossil fuel and sorbent 114 to the CFB heat generator 110 in the non-$CO_2$ capture mode.

Because of the increase in the amount of fossil fuel and sorbent 114' introduced to the CFB heat generator 110 when the CFB heat generating system 200 is operating in the $CO_2$ capture mode, the amount of hot solids falling to the bottom of the furnace will also increase correspondingly. Ultimately these hot solids, which are designated as hot solids 115, are drained from the bottom of the furnace of the CFB heat generator 110 to a conventional or other suitable ash cooler 116, which is preferably sized approximately ten to fifteen percent (10-15%) larger than necessary for operation in the non-$CO_2$ capture mode.

When operating in the $CO_2$ capture mode, the turbine 190 of the CFB heat generating system 100 will need to have approximately ten to fifteen percent (10-15%) greater capacity than that necessary for operation in the non-$CO_2$ capture mode, if CFB heat generating system 100 is to generate about the same amount of power in both modes of operation. The increased turbine capacity may be obtained by using different blades in the turbine 190 during operations in the $CO_2$ capture mode, from those used in turbine 190 during operations in the non-$CO_2$ capture mode. For example, it may be possible to re-blade turbine 190 prior to switching from operation in the non-$CO_2$ capture mode to operation in the $CO_2$ capture mode. Thus, re-blading of the turbine 190 is preferred.

The volume of the flow of the heated working fluid to the turbine 190 in the non-$CO_2$ capture mode will differ from that in the $CO_2$ capture mode. If CFB heat generating system 100 is to generate about the same amount of power in both modes of operation, the flow to the turbine 190 in the $CO_2$ capture mode will also differ from that to the turbine 190 of CFB heat generating systems 100 in the non-$CO_2$ capture mode. In this regard, the volume of the flow of heated working fluid 102 from the CFB heat generator 110 in the $CO_2$ capture mode will exceed that of heated working fluid 102 from the CFB heat generator 110 in the non-$CO_2$ capture mode. Additionally, as will be discussed further below, a new flow of superheated steam 286 is also received by the turbine 190 in the $CO_2$ capture mode.

The upsizing of the capacity of turbine will, in turn, require that the electricity generator (not shown) for the CFB heat generating system 100 have approximately ten to fifteen percent (10-15%) more capacity than that necessary for operation in the non-$CO_2$ capture mode, if CFB heat generating system 100 is to generate about the same amount of power in both modes of operation.

The boiler feed fluid heaters, pumps and condensers (all not shown) of the CFB heat generating system 100 will also have correspondingly greater capacity than needed for the non-$CO_2$ capture mode, if CFB heat generating system 100 is to generate about the same amount of power in both the non-$CO_2$ capture mode and the $CO_2$ capture mode.

Recycling Solids

The flue gas 104 is transported by ductwork to a hot solids-gas separator 118, shown to be a cyclone separator. The hot solids-gas separator 118 separates at least some of the hot solids from the flue gas. Preferably, the hot solids-gas separator 118 has tubes integrated into its wall structure, and is cooled by a working fluid, in this implementation water or a mixture of water and steam, flowing through these tubes.

Within the hot solids-gas separator 118, at least those hot solids that are above a predetermined size are preferably separated from the hot flue gas in which they are entrained. It should be noted that, although only one separator 118 is shown, multiple separators 118 are often used. The separated hot solids will contain unburned fuel, flyash and sorbent.

If not fitted for $CO_2$ capture, the separated hot solids 112 flow from the hot solids-gas separator 118 under gravity force to one or both of two recycling paths, and are ultimately reintroduced into the lower segment of the furnace of the CFB heat generator 110, and again subjected to the combustion process that takes place in the CFB heat generator 110. The hot separated solids 112a are directed along one path directly back to the CFB heat generator 110 without being cooled. The hot separated solids 112b are directed along the other path back to the CFB heat generator 110 via a heat exchanger 136, which is depicted to be a fluidized bed heat exchanger (FBHE), where they are cooled by transferring heat to a working fluid before their return to the generator 110. It will be recognized that the working fluid in the heat exchanger may, as desired, be of the same or a different type from that in the CFB heat generator 110. It should be noted that although a single heat exchanger 136 is shown, if the implementation includes multiple separators 118, a separate heat exchanger is typically provided for each separator.

If fitted for $CO_2$ capture, the hot separated solids 112b' are directed, in a gravity flow, along another path back to the CFB heat generator 110 via an added reactor subsystem, where the hot separated solids 112b' are further processed before their return to the heat exchanger 136 and ultimately to the generator 110. The added reactor subsystem, which includes a reactor 210, hot solids-gas separator 218 and backpass 222, will be described in further detail below. If fitted for $CO_2$ capture, hot separated solids 112b are preferably not directed to the heat exchanger 136.

One or more fluidizing blowers 176 function to provide the fluidizing air 177 or 177' to the heat exchanger 136. If not fitted for $CO_2$ capture, the fluidizing air 177 fluidizes the cooled solids 112c that leave the exchanger 136 and the hot solids 112a traveling on the other path, and force these fluidized solids to the CFB heat generator 110 for recycling. The recycled solids are inserted into the CFB in the generator 110 and combusted therewith.

On the other hand, if fitted for $CO_2$ capture, the fluidizing air 177' fluidizes the cooled solids 212c that leave the exchanger 136 and the hot solids 112a traveling on the other path, and force these fluidized solids to the CFB heat generator 110 for recycling. Here again, the recycled solids are inserted into the CFB in the generator 110 and combusted therewith.

As the separated solids 112 are directed from a lower segment of the combined hot solids-gas separator 118, one or more ash control valves (not shown) are typically used to control the flow of the separated solids between the available two paths, whether the system 100 is or is not fitted for $CO_2$ capture. As noted above, in either case, one of the paths provides a direct connection and the other path provides an indirect connection(s) to the lower segment of the furnace of the CFB heat generator 110.

In this regard, the separated solids 112a transported along one path are fed directly to the lower segment of the furnace of the CFB heat generator 110. On the other hand, the separated solids 112b or 112b' transported along the other path are fed indirectly to the lower segment of the furnace of the CFB heat generator 110 after passing through the heat exchanger 136. As noted above, if fitted for $CO_2$ capture, the separated solids 112b' will be fed indirectly to the heat exchanger 136, and from there to the lower segment of the furnace 110, only after also passing through the added reactor subsystem 210, 218.

The separated solids 112b transported from the separator 118, or the separated solids 212a transported from the added reactor subsystem, are cooled in the heat exchanger 136 by transferring heat to a working fluid, in the exemplary implementation being described this working fluid is water or a water-steam mixture, flowing in tubes disposed within the heat exchanger 136, resulting in cooled solids 112c, or cooled solids 212c if fitted for $CO_2$ capture, being directed to the lower segment of the furnace of the CFB heat generator 110. By controlling the flow and splitting of separated solids between the two available paths using any conventional or other suitable technique, the separated solids can be fed along one path or the other path, or simultaneously along multiple paths to the lower segment of the furnace of the CFB heat generator 110, such that a non-cooled stream of solids and/or a cooled stream of solids are returned to the CFB heat generator 110. This control in turn allows the temperature in the CFB heat generator 110 to be controlled by the received flow of the re-circulated solids.

Preheating the Fluidizing Air

Any remainder of the hot solids, e.g. those hot solids that are below a predetermined size, remain entrained in the separated flue gas 106 that is directed by ductwork from the hot solids-gas separator 118 to the backpass 122. The backpass 122 has tubes integrated into its wall structure, and is cooled by a working fluid flowing through these tubes. In the exemplary implementation being described, this working fluid is water or a mixture of water and steam, although another type working fluid could be use if so desired. In the backpass 122, additional heat transfer duty is performed to cool the flue gas and any remaining entrained hot solids. Further ductwork directs the cooled flue gas 150 from the backpass to a preheater 144, which is capable of preheating the fluidizing air that is being fed to the CFB heat generator 110. The preheater 144 is preferably a zero leakage tubular preheater. It will be recognized that the flue gas 150 flowing from the backpass to a preheater 144 is nitrogen rich. Preferably, fluidizing air 188, or 188' if fitted for $CO_2$ capture, is directed by ductwork to the preheater 144 before being introduced to the furnace of the CFB heat generator 110.

The preheater includes two available separate gas passageways. Passageway 144a is for directing flue gas 150 in either mode of operation to preheat the air. Passageway 144b is for directing gas 250 only in the $CO_2$ capture mode of operation to also preheat the air. If not fitted for $CO_2$ capture, the preheater 144 transfers heat from only the flue gas 150 transported from the backpass 122, to the fluidizing air 188. On the other hand, if fitted for $CO_2$ capture, the preheater 144 transfers heat both from the flue gas 150 transported from the backpass 122 and from gas 250 transported from the backpass 222 of the added reactor subsystem, to the fluidizing air 188'. In either case, the fluidizing air 188 or 188' is preheated in the preheater 144 to a desired temperature. As shown, the air 188 or 188' is pressurized and forced to the preheater 144, and ultimately to the CFB heat generator 110, by one or more blowers 180, which are shown to be either primary air (PA)

fans or secondary air (SA) fans. The preheated air 142, or the preheated air 142' if fitted for $CO_2$ capture, is directed by ductwork from the preheater 144 to the furnace of the CFB steam generator 110. The cooled flue gas 154 leaving the preheater 144 with the remaining entrained solids, is directed by ductwork along a path from the preheater 144 to a particulate removal component 152 of the APC subsystem. If fitted for $CO_2$ capture, the cooled gas 254 from the added reactor subsystem that leaves the preheater 144 is directed by ductwork along a different path from the preheater 144 to further processing components as will be described in detail below.

It will be recognized that, because of the increase in the amount of fossil fuel introduced to the CFB heat generator 110, the amount of air 142' delivered to the CFB heat generator 110 in the $CO_2$ capture mode will also preferably be ten to fifteen percent (10-15%) over the amount of air 142 delivered to the CFB steam generator 110 in the non-$CO_2$ capture mode, if CFB heat generating system 100 is to generate about the same amount of power in both modes of operation. Likewise, a corresponding increase in the volume of the air flow 188', as compared to the flow of air 188, to the preheater 144 is also required.

Downstream Flue Gas Processing

The particulate removal component 152, which is shown as an electrostatic precipitator system (EPS), removes relatively fine solids still entrained within the cooled flue gas 154. The flue gas 158 exiting the particulate removal component 152 is transported via more ductwork to a blower 162, which is shown as an induced draft (ID) fan.

All of the flue gas 164 exiting the blower 162 is transported via more ductwork towards the exhaust stack (not shown), typically passing through additional components of the APC subsystem before reaching the stack.

Piping and Ducting

As will be well understood by those skilled in the art in view of the above, working fluid piping (not shown), and air and flue gas ducting (not shown), of the CFB steam generating system 100 will also have correspondingly greater capacity than that needed in the non-$CO_2$ capture mode, if CFB heat generating system 100 is to generate about the same amount of power in both modes of operation.

Retrofitting for $CO_2$ Capture and Associated Operational Changes

The CFB heat generating system 100 may or may not be fitted for $CO_2$ capture at any particular time. Often, initial operations will be in a non-$CO_2$ capture mode. In such a case, the CFB heat generating system 100 can be easily later retrofitted for operations in the $CO_2$ capture mode. As noted above, to facilitate $CO_2$ capture, various components 200, which are designated as optional in FIG. 1, are added to the system. More particularly, the CFB heat generating system 100 is fitted with a parallel feed fluid heater (PFFH) 282, a gas cooler 260, a blower(s) 262, a gas processing component 266, and an added reactor subsystem that includes a reactor 210, a hot solids-gas separator 218 and a backpass 222. These components and the related changes in operational flows within the CFB heat generating system 100 in the $CO_2$ capture mode are described below.

Downstream Gas Processing to Heat Additional Working Fluid That Drives a Turbine When fitted for $CO_2$ capture, the PFFH 282, which in the exemplary implementation being described is a parallel feed water heater (PFWH), receives the cooled gas 254 exiting the preheater 144 via additional ductwork. The PFFH 282 transfers heat from the gas 254 to feed working fluid 284, which in this implementation is $H_2O$ in liquid form or what is commonly referred to as feed water. The transfer of heat can be controlled using known or other techniques such that the feed working fluid 284 is heated to a desired temperature. Preferably, the state of the feed working fluid is changed from a liquid to a gas, e.g. from water to steam, in the PFFH 282. A flow of the heated working fluid 286 is then directed to the turbine 190. The turbine 190 is preferably equipped for low level heat recovery from the PFFH 282 and has provision for compressor intercoolers. The flue gas 259 exiting the PFFH 282 is directed by ductwork to the gas cooler 260.

Downstream Gas Processing to Remove $H_2O$

It is worthwhile to note here that, in the $CO_2$ capture mode, the two largest constituent elements by volume of the gas 250 exiting the backpass 222 of the added reactor subsystem, if the system is coal fired, are $CO_2$ and $H_2O$. However, the gas 250 is also likely to include some $NO_X$, e.g. $NO_2$. This composition of the gas results from the reaction that occurs in the reactor 210 of the added reactor subsystem, as will be described further below.

In the gas cooler 260, some of the $H_2O$ vapor in the gas 259 is condensed out. The gas cooler 260 preferably does this by placing the gas 259 in contact with relatively colder water in countercurrent fashion, which in turn causes a relatively significant proportion of the $H_2O$ vapor in the gas 259 to condense into liquid water and separate from the flue gas. It may be beneficial for the gas cooler 260 to cool the gas 259 to the lowest temperature possible before further processing. Thus after cooling, and condensing and separating $H_2O$ from, the received gas 259, the gas cooler 260 exhausts dewatered gas 261, which now is mainly comprised of $CO_2$. The dewatered gas 261 is directed by ductwork to the blower 262.

Downstream Gas Processing to Capture $CO_2$ and $N_2$

The gas 264 exiting the blower 262 is directed to a location at which it can be further processed. More particularly, the gas 264 is directed to a recovery subsystem 266. The recovery subsystem 266 includes liquid recovery components that are operable to liquefy $CO_2$ within the gas 264 so as to render a liquid $CO_2$ end product suitable for a commercial application. The liquid $CO_2$ product could, for example, be used for enhanced oil recovery (EOR) or be sequestered.

The recovery subsystem 266 preferably also includes recovery components for recovering nitrogent and oxygen, which are non-condensable. If so, these recovery components are operable to produce a nitrogen ($N_2$) product and oxygen ($O_2$) from the gas 264. As with the liquid $CO_2$ product, the $N_2$ product could also, for example, be used for EOR or be sequestered. Depending on the implementation, it may be desirable to direct any recovered $O_2$ back to the reactor 210 of the added reactor subsystem.

The Added Reactor Subsystem

—System Components and Associated Flows—

As mentioned above, the added reactor subsystem includes a reactor 210, a hot solids-gas separator 218 and a backpass 222. When operating in the $CO_2$ capture mode, a flow of hot solids 112b' is directed, preferably by the gravitation forces, from the separator 118 to the reactor 210. It will be recognized that the ash produced by the combustion in the CFB heat generator 110 is rich in $CaSO_4$ and in CaO. Solid particles including fuel particles, such as crushed or pulverized coal or other solid fuel, and sorbent particles, such as crushed or pulverized limestone, dolomite or other alkaline earth material, form a fuel and sorbent mixture 114" that is also fed to the reactor 210. It may, in some implementations be advantageous to inject an absorbing agent, such as calcium carbonate, into the reactor 210, either separately, or together with the hot solids 112b' and/or fuel and sorbent mixture 114". A stream of fluidizing air 142' from the blower(s) 180 is also directed to the lower portion of the reactor 210.

The fuel in the fuel and sorbent mixture 114", along with any solid particles of fuel in the hot solids 112b', is combusted in the reactor 210, which generates heat. More particularly, the air 142' is supplied to a lower segment of the furnace of the reactor 210. There it fluidizes and reacts with the hot solids 112b' and fuel and sorbent mixture 114" being fed into the lower segment of the furnace of the reactor 210, thus aiding in the combustion of the fuel.

Various techniques can be used to control the operation of the reactor 210 so that the gas 204 exhausted from the reactor is rich in $CO_2$. For example, that gas produced in the reactor 210 can be charged with CaO, i.e. limestone, as it passes through the reactor, and the gas can thus be put in contact with any absorbing agent and with the CaO contained in the incoming flue gases so as to capture $CO_2$ contained in the flue gases, by means of the following reaction:

$$CaO + CO_2 => CaCO_3$$

If the reactor 210 is a re-circulating fast fluidized bed reactor, the gas transit time will be dependent on the desired $CO_2$ capture efficiency. $CO_2$ capture efficiency in such types of reactors have been reported to be in the range of twenty to eighty percent (20-80%), with gas transit times shorter than 10 seconds, and with solid transit times of several minutes. U.S. Pat. No. 6,737,031, which issued on May 18, 2004, is entitled "Method Of Simultaneously Reducing $CO_2$ And $SO_2$ Emissions In A Combustion Installation" and is assigned to the assignee of the present application, describes a re-circulating fast fluidized bed reactor and associated separator of a type which could be easily adapted for use in the CFB heat generating system 100 described herein. The disclosure of the '031 patent is incorporated in its entirety herein by reference.

Some of the solids present in the exhausted gas 204 that leaves the reactor 210 are extracted in the solid-gas separator 218, which is depicted as a cyclone separator. The gas 206 with part of the captured $CO_2$ content, the other part having been removed with the separated solids, is exhausted from the separator 218 and directed to the backpass 222.

The separated solids 212 are directed from a lower segment of the combined hot solids-gas separator 218. From there, portions of the separated solids 212 can be directed along different recycle paths. In this regard, the separated solids 212b are returned, preferably by gravitational forces, directly back to reactor 210 for recycling. However, the separated solids 212a are directed to the heat exchanger 236, where they are cooled before being recycled to the CFB heat generator 110. One or more ash control valves (not shown) are used to control the flow of the separated solids between the two paths as has previously been described with respect to the control of the flows from separator 118.

The separated solids 212a transported along the path that leads indirectly back to the lower segment of the furnace of the CFB heat generator 110, are fed to the heat exchanger 236, where they are cooled by a working fluid, as previously discussed. It will be recognized that these solids will be formed primarily of CaS. The cooled solids 212c, together with the hot separated solids 112a from the separator 118, are fluidized and forced by air 177' from the blower(s) 176 to the CFB heat generator 110 for recycling. Here again, by controlling the flow of separated solids 212a using any conventional or other suitable technique, the temperature within the heat exchanger 236 can be controlled. This will in turn allow the control of the temperature of the working fluid 102 leaving the CFB heat generator 110.

Additionally, by controlling the flow of hot solids along all the recycle paths from the separator 218, the temperature in the reactor 210 can be controlled. More particularly, controlling the flow and splitting of recirculated solids 212 leaving the separator 218 between the two paths, such that a controlled volume of non-cooled solids 212b are returned to the reactor 210, aids in the control of the temperature in the reactor 210.

The separated hot solids 212 may optionally be treated to improve their reactivity for $CO_2$ and $SO_2$ capture, e.g. by adding water or water vapor or by adding a reaction promoter such as sodium salts, before they are returned to the reactor 210 and/or the CFB heat generator 110.

The backpass 222 has tubes integrated into its wall structure, and is cooled by a working fluid flowing through these tubes. In the exemplary implementation being described, this working fluid is water or a mixture of water and steam, although another type working fluid could be use if so desired. In the backpass 222, additional heat transfer duty is performed to cool the gas and any remaining entrained hot solids. Further ductwork directs the flue gas 250 from the backpass to preheater 144, and from there to the downstream processing components discussed above.

When fitted and operating in the $CO_2$ capture mode, the blowers 176 and 180 are preferably adjusted so that the amount of air to the CFB heat generator 110 and the heat exchanger 136 results in velocities throughout the CFB heat generating system 100 about ten to fifteen percent (10-15%) greater than those during operations in the non-$CO_2$ capture mode, in order to increase the working fluid output and temperatures correspondingly above those obtained during operation in the non-$CO_2$ capture mode.

Accordingly, the embodiment of the invention described above provides a technique that facilitates the conversion of an air fired CFB heat generating system to enable the capture of the generated $CO_2$, at less expense and/or greater efficiency than known techniques. The described technique minimizes or even eliminates any energy penalty for $CO_2$ capture. Indeed, after being fitted for $CO_2$ capture, approximately the same net electrical output can be obtained whether or not fitted for $CO_2$ capture. It should be noted that using the described technique, the conversion to $CO_2$ capture requires no modification to the air fired CFB steam generator pressure parts, or to other components of the air fired CFB heat generating system.

While an embodiment(s) of our invention have been described, it will be appreciated that modifications thereof, some of which have been alluded to hereinabove, may still be readily made thereto by those skilled in the art. It is therefore intended by the appended claims to cover the modifications alluded to herein as well as all the other modifications that fall within the true spirit and scope of our invention.

We claim:

1. A heat generating system for capturing $CO_2$, comprising:
   a combustor configured to combust a fluidized bed of fossil fuel to heat a working fluid and to generate first gas and residual first solids;
   a reactor configured to combust the generated first solids to thereby generate second gas and residual second solids; and
   a preheater having a first gas passageway configured to direct the generated first gas and a second gas passageway configured to direct the generated second gas so as to preheat air, thereby cooling the directed first gas and the directed second gas;
   wherein the combustor is further configured to apply the preheated air to fluidize a bed of fossil fuel.

2. The system according to claim 1, wherein:
the air preheater is further configured to direct the cooled first gas to a first path, and the cooled second gas to a second path different than the first path.

3. The system according to claim 1, wherein the combustor is further configured to exhaust the generated first gas with the generated residual first solids entrained therein and the reactor is further configured to exhaust the generated second gas with the generated residual second solids entrained therein, and further comprising:
a first separator configured to separate the entrained first solids from the exhausted first gas, wherein the generated first gas directed by first gas passageway is the separated first gas and the generated first solids combusted by the reactor are the separated first solids; and
a second separator configured to separate the entrained second solids from the exhausted second gas, wherein the generated second gas directed by second gas passageway is the separated second gas.

4. The system according to claim 3, further comprising:
a heat exchanger configured to transfer heat from at least a portion of the separated second solids to thereby cool these separated hot other solids;
wherein the combustor is further configured to combust the cooled second solids.

5. The system according to claim 4, wherein:
the reactor is further configured to also combust a portion of the separated second solids.

6. The system according to claim 3, wherein (i) the air preheater is further configured to direct the cooled first gas to a first path and to direct the cooled second gas to a second path different than the first path, and (ii) the working fluid is a first working fluid, the cooled first gas, and further comprising:
a working fluid heater configured to transfer heat from the cooled second gas directed to the second path to a second working fluid; and
a turbine configured to received the heated first working fluid and the heated second working fluid.

7. The system according to claim 3, wherein the air preheater is further configured to direct the cooled first gas to a first path and the cooled second gas to a second path different than the first path, and further comprising:
a $CO_2$ remover configured to remove capture $CO_2$ from the cooled second gas directed to the second path.

8. A heat generating system operable in a non-$CO_2$ capture mode or a $CO_2$ capture mode, comprising:
a combustor configured to (i) combust a fluidized bed of fossil fuel to heat a working fluid and generate flue gas, and (ii) exhaust the heated working fluid and the generated flue gas; and
a preheater configured to preheat air, and having a first gas passageway for directing the exhausted flue gas to preheat the air and a second gas passageway for directing other gas with $CO_2$ generated by combustion outside of the combustor;
wherein the combustor is further configured to fluidize a bed of fossil fuel with the preheated air;
wherein, in the non-$CO_2$ capture mode, (i) the preheater receives the exhausted flue gas, but not the other gas, and (ii) the first passageway directs the received flue gas to preheat the air, thereby cooling the directed flue gas.

9. The system according to claim 8, wherein, in the $CO_2$ capture mode:
the preheater also receives the other gas;
the second passageway also directs the received other gas to preheat the air, thereby cooling the directed other gas;
the preheater directs the cooled flue gas to a first path, and the cooled other gas to a second path different than the first path.

10. The system according to claim 8, the combustion of the fluidized bed also generates residual first solids and the combustor is further configured to exhaust the generated flue gas with the generated first solids entrained therein, and further comprising:
a separator configured to separate the entrained first solids from the exhausted flue gas, wherein the exhausted flue gas received by the preheater is the separated flue gas; and
a heat exchanger configured to transfer heat from solids to thereby cool the solids;
wherein, only in the non-$CO_2$ capture mode, the heat exchanger transfers heat from the separated first solids to thereby cool the separated first solids, and the combustor is further configured to combust the cooled first solids.

11. The system according to claim 10, wherein the separator is a first separator, and further comprising in the $CO_2$ capture mode:
a reactor configured to (i) combust the separated first solids to thereby generate the other gas and residual second solids, and (iii) exhaust the generated other gas with the generated second solids entrained therein; and
a second separator configured to separate the entrained second solids from the exhausted other gas;
wherein the heat exchanger transfers heat from at least a portion of the separated second solids to thereby cool these separated second solids, and the combustor is further configured to combust the cooled second solids;
wherein the preheater also receives the separated other gas, and the second passageway also directs the received other gas to preheat the air, thereby cooling the directed other gas, and the preheater directs the cooled flue gas to a first path, and the cooled other gas to a second path different than the first path.

12. The system according to claim 11, wherein:
the reactor is further configured to also combust a portion of the separated other solids.

13. The system according to claim 11, wherein the working fluid is a first working fluid, and further comprising:
a working fluid heater configured to (i) transfer heat from the cooled other gas directed to the second path to a second working fluid, and (ii) exhaust the heated second working fluid; and
a turbine configured to received the exhausted first working fluid and the exhausted second working fluid.

14. The system according to claim 11, further comprising:
a $CO_2$ remover configured to remove $CO_2$ from the cooled other gas directed to the second path.

15. A method of operating a heat generating system, having a preheater for preheating air that includes a first gas passageway and a second gas passageway, comprising:
combusting a fluidized bed of fossil fuel to heat a working fluid and generate first gas;
when the heat generating system is only in a non-$CO_2$ capture mode;
directing the generated first gas via the first gas passageway to preheat the air, thereby cooling the generated first gas;
directing the cooled first gas along a first path;
fluidizing a bed of fossil fuel with the preheated air;
when the heat generating system is only in a $CO_2$ capture mode:

combusting the generated residual solids to generate a second gas with $CO_2$;

directing the generated second gas via the second gas passageway to preheat the air, thereby cooling the generated second gas; and directing the cooled second gas along a second path different than the first path; and removing $CO_2$ from the cooled second gas directed along the second path.

16. The method according to claim 15, wherein the combusting of the fluidized bed also generates residual solids that are entrained in the generated first gas, and further comprising:

separating the entrained solids from the generated first gas, wherein the first gas directed via the first passageway is the separated first gas; and in only the non-$CO_2$ capture mode, transferring heat from the separated solids to thereby cool the separated solids, and combusting the cooled solids to heat the working fluid.

17. The system according to claim 16, wherein the solids are first solids, and further comprising in only the $CO_2$ capture mode:

also combusting the separated first solids to generate second gas, with $CO_2$, and residual second solids that are entrained in the generated second gas;

separating the entrained second solids from the generated second gas;

transferring heat from at least a portion of the separated second solids to thereby cool the separated second solids, and combusting the cooled second solids to heat the working fluid;

also directing the generated second gas via the second passageway to preheat the air, thereby cooling the directed second gas; and directing the cooled second gas along a second path different than the first path.

18. The method according to claim 17, wherein:

combusting a portion of the separated second solids to generate second gas with $CO_2$.

19. The method according to claim 17, wherein the working fluid is a first working fluid, and further comprising:

transferring heat from the cooled second gas to a second working fluid; and driving a turbine with the heated first working fluid and the heated second working fluid.

20. The method according to claim 17, further comprising:

removing $CO_2$ from the cooled second gas directed along the second path.

* * * * *